United States Patent [19]
Stephens

[11] 3,900,135
[45] Aug. 19, 1975

[54] LIQUID DISTRIBUTION SYSTEMS

[75] Inventor: James B. Stephens, La Crescenta, Calif.

[73] Assignee: Westates Space-Era Products, Inc., S. El Monte, Calif.

[22] Filed: June 24, 1974

[21] Appl. No.: 482,372

[52] U.S. Cl. .................. 222/52; 222/444; 222/450
[51] Int. Cl. ............................................. B67d 5/08
[58] Field of Search .......... 222/52, 59, 63, 444, 450

[56] References Cited
UNITED STATES PATENTS

| | | | |
|---|---|---|---|
| 2,961,880 | 11/1960 | Griswold | 222/444 X |
| 3,194,434 | 7/1965 | Evanson | 222/444 X |
| 3,651,989 | 3/1972 | Westrich | 222/59 X |

Primary Examiner—Stanley H. Tollberg
Assistant Examiner—John P. Shannon
Attorney, Agent, or Firm—Edward D. O'Brian

[57] ABSTRACT

A liquid distribution system intended for use in watering plants may be constructed so as to utilize a plurality of holding means for holding liquid connected at various points along the length of a conduit. A supply means such as a pump or a valve connected to a water line is in communication with one end of the conduit for the purpose of controlling when water is supplied to the conduit under pressure. A detection means for determining a condition in the conduit is connected to the conduit or in the holding means. When water is supplied to the conduit the holding means sequentially receive and hold water in a manner that there is a change in the condition detected by the detection means. When this change is detected by the detection means the latter operates to cause the individual dispensing means to distribute water from each of the holding means.

18 Claims, 5 Drawing Figures

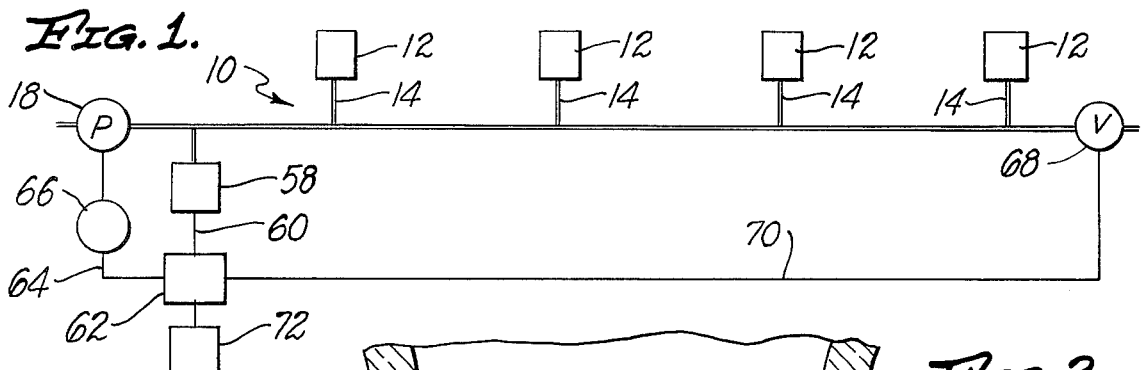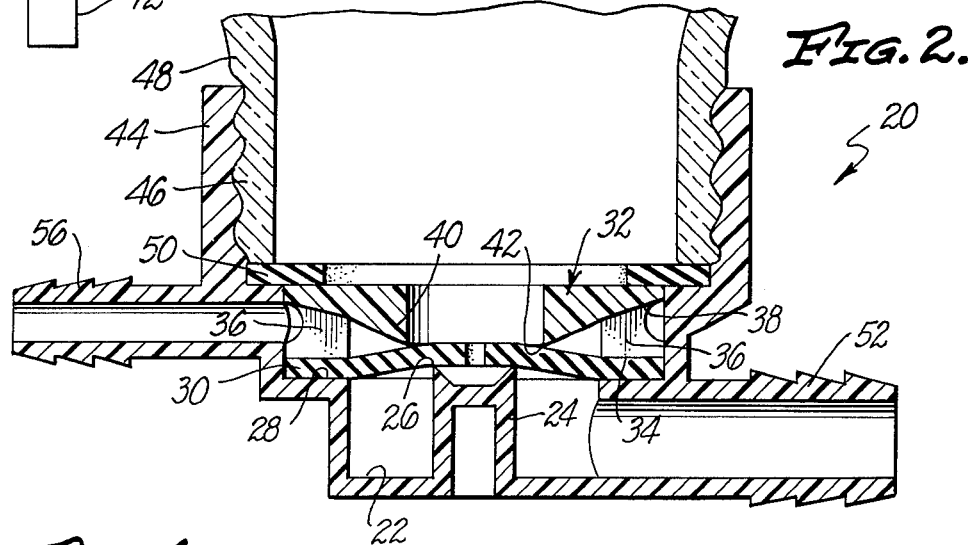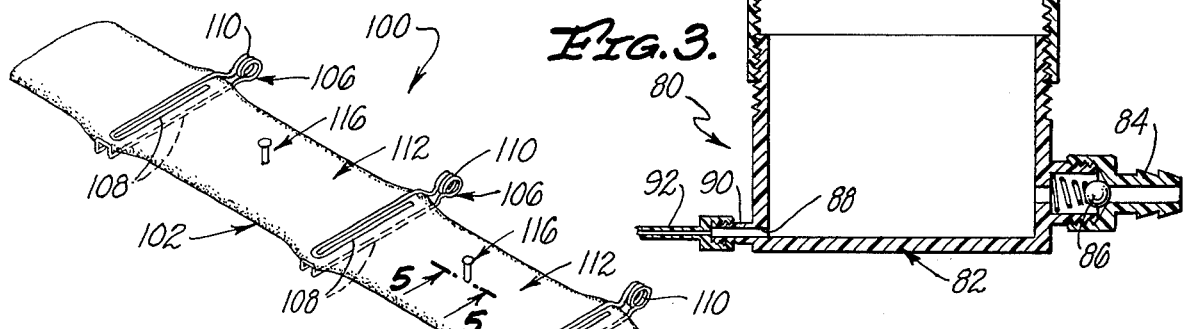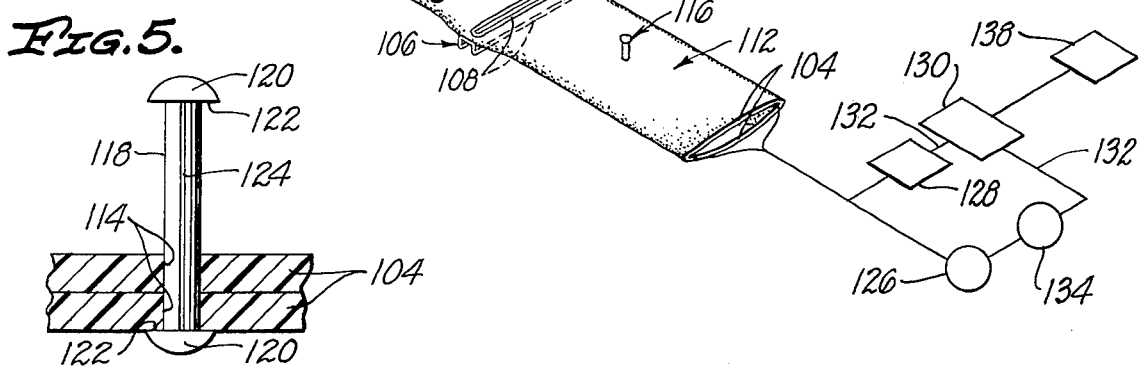

LIQUID DISTRIBUTION SYSTEMS

CROSS REFERENCE TO RELATED APPLICATIONS

This application relates to subject matter which is disclosed and claimed in the co-pending, commonly owned U.S. patent application Ser. No. 492,488 filed July 29, 1974, entitled "Fluid Dispensing Structures", in the co-pending, commonly owned U.S. patent application Ser. No. 482,227 filed June 24, 1974, entitled "Liquid Measuring Devices", and in the co-pending, commonly owned U.S. patent application Ser. No. 481,050 filed June 20, 1974 entitled "Fluid Distribution Structure". The entire disclosures of all of these co-pending applications are incorporated herein by reference.

BACKGROUND OF THE INVENTION

The invention set forth in this application pertains to new and improved liquid distribution systems which are primarily intended to be used in watering plants, but which are also capable of being used in distributing quantities of other liquids at various locations.

The increasing acceptance of so-called "drip irrigation" procedures has resulted in the development of many different devices and structures for use in distributing water at a relatively controlled or metered rate. Many of such devices are separate structures which are intended to be utilized along the length of a principal supply conduit. Frequently such devices are connected to such a conduit by lateral conduits or tubes leading off of a principal water source. On occasion, such structures are directly installed on a principal conduit or are formed as a part of such a conduit. Such structures on occasion may be so simple as to, in effect, consist of one or more holes.

Various devices and structures as are indicated in the preceding paragraph are primarily intended to supply controlled or metered quantities of water to plants on an essentially continuous basis as water is supplied to the conduit used in connecting these devices. Thus, normally these prior dispensing devices and structures have operated on an essentially continuous basis so as to dispense water so long as water is supplied to them under pressure. With structures of this type the amount of water supplied to a plant at a particular location is primarily controlled by restricting the flow of water through an orifice or a small channel and by regulating the pressure of the water supplied to the orifice or channel. This type of procedure is unquestionably effective but it is not considered to control the amount of water dispensed at a particular location as accurately as is normally desired.

The desire to accurately dispense measured quantities of water at different dispensing locations has resulted in the development of various types of dispensing structures to dispense or meter out controlled quantities of water. Effective devices of this type are indicated in the aforenoted co-pending applications entitled, "Liquid Measuring Devices", "Fluid Dispensing Structures", and "Fluid Distribution Structures". These devices or structures have to be externally controlled through the use of external water pressure. The manual control of such structures as, for example, by the manual operation of a valve or pump is considered undesirable because there is a chance that all of a plurality of such structures connected along a length of conduit will not be filled with water and/or effectively utilized. Also there is the chance that the water conduit used with such devices may be held under pressure for a significant or undesirably long period. Although this would not be particularly significant with rigid conduit such as conventional water pipe, it can be significant in the agricultural watering field where the conduits used are normally small thin-walled, thermoplastic polymer tubes.

SUMMARY OF THE INVENTION

The invention set forth in this specification is intended to provide new and improved liquid distributing systems which can be utilized in dispensing quantities of water at different dispensing locations. A more specific objective of the present invention is to provide new and improved liquid distribution systems which can be effectively utilized with various types of dispensing structures which are responsive in one manner or another to applied water pressure. Another objective of the invention is to provide systems as indicated which can be effectively and easily utilized in connection with a series of such dispensing structures located along the length of a conduit so as to effectively utilize all of said dispensing structures without resulting in the conduit having to constrain liquid at an undesirably high pressure for a prolonged period.

The invention is also intended to provide new and improved liquid distribution systems which are primarily useful for agricultural applications, which may be easily and conveniently constructed, which are relatively simple to operate, and which may be utilized over a prolonged period of time with a minimum of difficulty and maintenance. Various other objects of the invention will be apparent from a detailed consideration of the entire disclosure embodied in this specification and in the accompanying drawings.

In accordance with this invention these objectives are achieved in a liquid distribution system in which liquid is conveyed through a conduit to a plurality of dispensing locations and is dispensed at each of the locations by the improvement which comprises: a plurality of separate holding means for holding a quantity of liquid, these holding means being connected at various points along the length of the conduit, a dispensing means for dispensing liquid associated with each of the holding means, liquid supply means for supplying liquid under pressure at intervals to one end of the conduit, the holding means being capable of sequentially receiving the holding liquid supplied to the conduit so that as the liquid is supplied there will be an increase in pressure when all of the holding means have received liquid, and condition responsive detection means connected to the system and to the supply means for terminating liquid being supplied to the conduit upon a condition change being detected.

BRIEF DESCRIPTION OF THE DRAWINGS

Unfortunately no summary is able to completely indicate many significant facets and aspects of an invention such as the invention set forth in this specification. Further details of the invention are best indicated with reference to the remainder of this specification, the appended claims, and the accompanying drawings in which:

FIG. 1 is a schematic view of a presently preferred embodiment or form of a liquid distribution system in accordance with the invention;

FIG. 2 is a cross-sectional view taken from the side of a liquid measuring device capable of being employed in the system illustrated in FIG. 1;

FIG. 3 is a cross-sectional view of a liquid dispensing device which is capable of being employed in the system illustrated in FIG. 1 even though the use of this distribution device is not preferred in accordance with the concepts of this invention;

FIG. 4 is a partially schematic, partially isometric view of a modified embodiment or form of a liquid distribution system in accordance with this invention;

FIG. 5 is a partial cross-sectional view taken at line 5—5 of FIG. 4.

From a consideration of these drawings and the remainder of this specification it will be apparent that the essential features and principles of the invention set forth in the appended claims can be utilized in a wide variety of differently appearing and differently constructed liquid distributing systems. Such differently appearing and differently constructed liquid distributing systems can easily be designed through the use of routine skill in the hydraulic field on the basis of the disclosures embodied in this specification.

DETAILED DESCRIPTION

In FIG. 1 of the drawing there is shown a liquid distribution system 10 in accordance with the invention which can be effectively employed in watering various types of plants in various types of environments. This system 10 incorporates a series of liquid measuring devices 12 which are connected by lateral tubes 14 leading off of a principle supply conduit or tube 16. One end of this conduit 16 is connected to what is referred to herein as a "supply means" 18. In the embodiment of the system 10 shown this supply means 18 is a pump used to supply liquid under pressure to the conduit 16. This supply means 18 may be a large valve which is used to regulate the flow of liquid from a water main or the like (not shown) to the conduit 16 as the system 10 is operated.

The operation of this system 10 is directly related to the manner in which the measuring devices 12 operate. These devices 12 may be constructed in any of the manners indicated in the aforenoted co-pending application entitled, "Liquid Measuring Devices". The particular devices 12 illustrated correspond to one type of device shown in this co-pending application. These devices 12 are constructed so as to each include a centrally located housing 20 formed so as to include an internal annular cavity 22 extending around a centrally located upstanding boss 24 terminating in a circular, upwardly directed edge 26 which serves as a valve seat. A shoulder 28 is provided within the housing 20 adjacent to one end of the cavity 22.

This shoulder 28 serves to uphold an elastomeric or rubber valve member or diaphragm 30 so that it is supported to extend across one end of the cavity 22 in such a manner as to normally abut against the edge 26. This diaphragm 30 is normally retained in this operative position by a retainer ring 32 located within the cavity 22 so that its bottom surface 34 abuts against the diaphragm 30. Grooves 36 are located in this bottom surface 34 so as to place the interior of the ring 32 in communication with an annular groove 38 extending completely around it.

The ring 32 also includes an internal annular flange 40 terminating in an annular, downwardly directed edge 42 which also serves as a valve seat. The diameter of this edge 42 is larger than the diameter of the edge 26; this edge 42 is preferably spaced so that when the diaphragm 30 is in a normal position the diaphragm 30 is spaced from it. The edge 42 is, however, located so that when the diaphragm 30 is distended a small amount by liquid under pressure within the cavity 22 it will fit against the edge 42 so as to form a seal against it.

The housing 20 preferably also includes an outwardly spaced, internally threaded annular skirt 44 located generally above the ring 32. This skirt 44 is designed to hold a threaded neck 46 of an inverted bottle 48 serving as an accumulator so that the interior of the bottle 48 is opened to the interior of the housing 20. As indicated in the noted co-pending application entitled, "Liquid Measuring Devices" a wide variety of different accumulator structures as are known in the hydraulic field may be utilized instead of the bottle 48. If desired, a small sealing washer 50 may be inserted under the neck 46 for the obvious purpose.

As a measuring device 12 operates a liquid such as water conveyed to it through a tube such as the tube 14 passes through an inlet nipple 52 into the cavity 22. Such liquid will be held within this cavity 22 until the pressure of such liquid is sufficient to distend the diaphragm 30 generally upward into the bottle 48, trapping the gas (normally air) within the upper region of this bottle 48. As the diaphragm 30 distends in this manner, the pressure of the applied fluid will normally be adequate to move the diaphragm 30 against the edge 42 so that substantially all of the fluid flowing into the bottle will be held within this bottle and the housing 20 until such time as the pressure of the supplied liquid is reduced.

At this point the diaphragm 30 will contract back to its initial position so as to seat against the edge 26. As this occurs the liquid trapped within the bottle 48 will flow because of the pressure of the gas trapped in the bottle 48 so as to move underneath the edge 42 and through the grooves 36 and 38 to an outlet nipple 56 attached to the housing 20. Normally such nipple 56 will be connected to one or more distribution tubes (not shown). If desired, however, the nipple 56 may be used to distribute liquid directly to a desired location.

In the system 10 as the supply means 18 is actuated so as to supply liquid under pressure to the conduit 16, the supplied fluid will tend to fill the accumulators (the bottles 48) used with the devices 12 along the length of the conduit 16. All of the devices 12 will be filled in this manner and after they are filled, a decrease in flow will occur at the supply means 18. At such time as a decrease in flow occurs at this location what is referred to herein as a "detection means" 58 connected to the conduit 16 adjacent to the supply means 18 is actuated.

Preferably this detection means 58 is a known or conventional responsive switch which will transmit an electrical signal through electrical lines 60 to a control unit 62. This will cause the control unit 62 to transmit another signal through lines 64 to an actuator 66 for the supply means 18 so as to cause the actuator 66 to operate the supply means 18 so that liquid under pressure is no longer supplied to the conduit 16. When the supply means 18 is a pump as indicated in the preceding an actuator 66 will normally be an electric motor. When the supply means 18 is a valve such an actuator 66 will normally be a control unit for such a valve such as a solenoid.

As the supply of liquid to the conduit 16 is shut off in this manner, there will normally be an instantaneous pressure drop in the conduit 16 resulting from the operation of the measuring devices 12. If desired, this pressure drop may be accentuated in various ways which are known in the hydraulic industry. As an example of this liquid may be bled off for an instant from within the conduit 16 through an unloading valve 68 connected to the conduit 16. The valve 68 is shown as directly connected to the control unit 62 by electrical lines 70. As the pressure drop occurs in the conduit 16 the individual measuring devices 12 will operate so as to dispense their contents as previously indicated. They will operate to dispense essentially uniform quantities of liquid regardless of where they are located vertically with respect to one another. This latter can be quite important in agricultural uses along hillsides.

The control unit 62 may be constructed in a known or conventional manner so as to incorporate a conventional timing mechanism (not shown) which will supply a signal to the actuator 66 in order to "turn on" the supply means 18 at given or predetermined time intervals. This control unit 62 may also be constructed so as to be responsive to a known device 72 so as to turn on the supply means 18 in accordance with an independent variable such as soil moisture content, the water level within a sump or the like. Thus, this control unit 62 may be of a known type which will cause operation of the supply means 18 when a liquid level or content drops below a predetermined value regardless of the time interval required for this to occur and which, if desired, can also cause operation of the supply means 18 after a predetermined time period even if actuation has not been caused in accordance with such a variable.

It is possible to substitute for the measuring devices 12 described in the preceding discussion measuring devices such as the device 80 shown in FIG. 3 of the drawings. The use of devices corresponding to the device 80 is not, however, preferred in accordance with this invention. The device 80 includes a housing 82 having an inlet nipple 84 within which there is located a conventional spring loaded check valve 86 designed to prevent backflow from the housing 82 into a tube such as the tube 14 connected to the nipple 84. This nipple 84 leads to adjacent to the bottom of the housing 82. This housing 82 is completely enclosed except for a very small opening 88 located adjacent to its bottom. If desired this opening 88 may be connected through the use of another nipple 90 to a tube 92 of very small internal diameter used to distribute liquid.

The device 80 in some respects operates in a manner which is somewhat related to the manner in which the devices 12 operate. As liquid is supplied into the housing 82 through the nipple 84 this liquid will tend to accumulate in the housing 82 as the pressure of the entering liquid compresses the gas within the top of the housing 82. As this occurs some liquid will pass out of the housing 82 through the opening 88. This opening 88 is preferably kept small enough so that the quantity of liquid passing through the opening 88 will be very significantly less than the quantity of liquid flowing to within the housing 82 at any time. The use of the tube 92 is desirable in further controlling or limiting the outward flow which will occur as liquid is supplied to the interior of the housing 82.

As a result of the fact that the flow into the housing 82 will exceed the flow outwardly from the housing 82 during an interval when liquid is supplied under pressure devices such as the device 80 will operate in much the manner in which the devices 12 operate in the system 10. When liquid is no longer supplied to them the air trapped within them will, of course, tend to empty them. The use of these devices 80 in the system 10 is not, however, preferred inasmuch as they do not meter out or measure a quantity of water with any accuracy. Further, with them, there is always the danger of clogging impeding fluid flow.

In FIG. 4 of the drawings there is shown a modified liquid distribution system 100 in accordance with this invention. This system 100 is related to the subject matter of the co-pending application referred to in the preceding entitled, "Fluid Distribution Structure" in much the same manner in which the aforenoted application entitled, "Liquid Measuring Devices" is related to the fluid distribution system 10. This system 100 can be modified in various manners as are indicated in the noted application entitled, "Fluid Distribution Structure" and also as indicated in the co-pending application noted in the preceding entitled, "Fluid Dispensing Structures" without altering its fundamental mode of operation.

This system 100 utilizes an elongated flexible conduit 102 which is preferably formed out of a thermoplastic polymer so that it can assume a flat configuration as shown in which sides 104 of it are located against one another so that the interior of the conduit 102 is closed off. Spring clamps or clips 106 each having two arms 108 connected by a center spring section 110 are located at periodic intervals along the length of the conduit 102 so that normally the arms 108 fit against the sides 104 in order to close off the interior of the conduit 102 into a plurality of sections 112.

In each of these sections 112 aligned holes 114 in the sides 104 are connected by what can be referred to as "flow control means" 116. In the precise structure shown these means 116 are formed of rivets having elongated shanks 118 fitting through the holes 114 and having heads 120. These heads 120 have flat under surfaces 122 and the shanks 118 have grooves 124 extending along their lengths to the surfaces 122. The holes 114, the shanks 118, and the heads 120 are dimensioned so that the sides 104 can move against and along the shanks 118 and so that the heads 120 will limit or stop such movement.

No effort is made in this specification to discuss in detail the various alternative flow control means which may be substituted for the precise flow control means 116 described in the preceding paragraph. Such alternatives are indicated to a significant extent in the noted co-pending application entitled, "Fluid Dispensing Structure". Similarly various modified clamps or clips which may be substituted for the clips 106 are to a degree indicated in the co-pending application entitled, "Fluid Distribution Structures". The precise flow control means 116 described require for their operation that the under surfaces 122 be of such a nature that they will not fit so as to form a "complete" or "absolute" seal against one of the sides 104. This may be accomplished by forming these under surfaces 122 with minor, normally not apparent, surface irregularities and/or a small groove (not shown).

As the system 100 is operated liquid under pressure is supplied to one end of the conduit 102 from a supply means 126 corresponding to the supply means 18 previously described. As this occurs, the entering liquid will exert pressure against the sides 104 and, if the pressure is great enough, in due course the conduit 102 will tend to expand adjacent to the clip 106 which is closest adjacent to the supply means 126. The pressure applied in this manner will cause the arms 108 of this clip to open up to a sufficient extent so that liquid will flow into the section 112 closest adjacent to the supply means 126.

As this occurs the sides 104 within the section 112 will tend to expand as a very limited quantity of liquid escapes through the groove 124. As the sides 104 expand further they will abut against the heads 120. This will cause a valve-type sealing action at the surfaces 122 preventing any significant external escape of liquid from within the particular section 112. As this section 112 fills up the next succeeding section 112 will fill up in a similar manner. This process will continue until all of the sections 112 contain liquid under pressure.

At this point a detection means 128 corresponding to the previously described detection means 58 will be actuated. This detection means 128 is connected to a control unit 130 corresponding to the unit 62 previously described by electrical lines 132. This control unit 130 is connected to an actuator 134 corresponding to the previously described actuator 66 by further lines 132. The actuator 134 is connected to the supply means 126 so as to control the utilization of the supply means 126 as previously described. If desired, a sensing device 138 corresponding to the previously described device 72 may also be connected to the control unit 130.

When the detection means 128 detects a decrease in flow as indicated the entire system 100 is thereafter operated in the same manner as the system 10. When the supply of fluid under pressure to the conduit 102 is cut off there will be a gradual loss of pressure in the conduit 102 as comparatively minor quantities of fluid seep from underneath the heads 120. Such pressure loss will result from the operation of gravity and from the inherent resiliency of the sides 104 tending to cause these sides 104 to collapse towards one another. As this occurs, the grooves 124 will be exposed so that liquid in each section 112 can escape more freely from within the sections 112.

Thereafter through the operation of the detection means 128 the system 100 will be operated at time intervals in the manner described in the preceding. If desired, however, the system 100 may be again operated in accordance with an independent variable such as the adjacent moisture level through the operation of the sensing device 138. Because these manners of operation are apparent, it is not considered necessary to discuss them in detail herein.

We claim:
1. In a liquid distributing system in which liquid is conveyed through a conduit to a plurality of dispensing locations and is dispensed at each of said locations the improvement which comprises:
 a plurality of separate holding means for holding a quantity of liquid, said holding means being connected at various points along the length of said conduit,
 a plurality of separate dispensing means for dispensing liquid from said holding means, each of said dispensing means being associated with one of said holding means,
 liquid supply means for supplying liquid under pressure at intervals to one end of said conduit,
 said holding means being capable of receiving and holding liquid when liquid is supplied to said conduit by said supply means so that as such liquid is supplied there will be a decrease in flow from said supply means when all of said holding means have received liquid supplied by said supply means, and
 flow responsive detection means connected to said conduit, said detection means being responsive to a decrease in flow from said supply means into said conduit and being connected to said supply means so as to be capable of terminating liquid being supplied to said conduit upon a decrease in flow from said supply means into said conduit.

2. A liquid distributing system as claimed in claim 1 wherein:
 said holding means are connected to said conduit at periodic intervals along the length of said conduit,
 each of said holding means comprises a measuring means,
 each of said measuring means including an accumulator means for receiving liquid under pressure and for discharging such liquid after it has no longer received liquid under pressure and valve means for preventing the discharge of liquid from said accumulator means when liquid under pressure is supplied to said measuring device and for causing the liquid held by said accumulator means to be discharged through one of said dispensing means when liquid is not being supplied under pressure to said accumulator means.

3. A liquid distributing system as claimed in claim 2 wherein:
 each of said dispensing means is an outlet connected to receive liquid from one of said accumulator means through the valve means associated therewith.

4. A liquid distributing system as claimed in claim 1 wherein:
 said conduit is an elongated, flexible conduit having sides capable of being located against one another so as to close off the interior of said conduit,
 each of said holding means includes a section of said conduit,
 and including
 clip means having spring biased arms engaging the sides of said conduit at each end of each of said sections,
 and wherein
 each of said dispensing means comprises flow control means for limiting the flow of liquid from within each of said sections.

5. A liquid distributing system as claimed in claim 4 wherein:
 each of said flow control means comprises an elongated member having a shank and head at each of its ends positioned so its shank extends through aligned holes in its sides.

6. A liquid distributing system as claimed in claim 5 wherein:

said sides are capable of fitting against said heads so as to block the flow of liquid from within the interiors of said sections when said sides are expanded by liquid within the interiors of said sections.

7. A liquid distributing system as claimed in claim 1 wherein:
each of said holding means comprises an accumulator means for receiving liquid under pressure and for discharging the liquid received upon a drop in the pressure of the liquid supplied,
each of said dispensing means comprises an opening leading from one of said accumulator means.

8. A liquid distributing system as claimed in claim 1 including:
control means connected to said detection means and to said supply means for operating said supply means when there is a decrease in flow detected by said detection means.

9. A liquid distributing system as claimed in claim 8 wherein:
said control means includes timing means for actuating said supply means at periodic intervals.

10. A liquid distributing system as claimed in claim 8 including:
means for determining a variable adjacent to said system connected to said control means for causing operation of said supply means at a predetermined value of said variable.

11. A process for distributing a liquid to a plurality of locations which comprises:
supplying a liquid under pressure from one end of a conduit to a plurality of separate holding means connected at various points along the length of said conduit so as to cause said holding means to receive and hold liquid and so as to cause a pressure rise and a decrease in flow along the length of said conduit as said liquid is supplied to said conduit,
ceasing to supply liquid under pressure to said conduit when there has been a decrease in flow at the supply end of said conduit,
thereafter, allowing the liquid held by each of said holding means to be discharged to said locations through a dispensing means associated with each of said holding means.

12. A process as claimed in claim 11 including:
again supplying liquid under pressure to said one end of said conduit after a predetermined time interval.

13. A process as claimed in claim 11 including:
again supplying liquid under pressure to said one end of said conduit when an independent variable reaches a predetermined value.

14. A process as claimed in claim 11 wherein:
each of said holding means comprises an accumulator means for receiving liquid under pressure and for discharging the liquid received upon a drop in the pressure of the liquid received, and valve means for controlling the flow from the associated accumulator means so that such flow is not back to said conduit.

15. A process as claimed in claim 14 wherein:
each of said valve means is capable of preventing the discharge of liquid from its associated accumulator means when liquid is being supplied under pressure.

16. A process as claimed in claim 11 wherein:
said conduit is an elongated, flexible conduit having sides capable of being pressed together so as to close off the interior of said conduit,
each of said holding means comprises a section of said conduit, said sections being defined at their ends by pressure responsive means normally holding said sides so as to close off said conduit and permitting flow of fluid from one section to the next as liquid is supplied under pressure to said one end of said conduit.

17. A process as claimed in claim 11 wherein:
liquid within each of said sections is discharged by a flow control means and wherein each of said flow control means is capable of permitting limited flow from each of said sections.

18. A process as claimed in claim 17 wherein:
each of said flow control means is capable of stopping the flow from within the section with which it is associated when said sides are expanded by liquid within such sections.

* * * * *